United States Patent
Archibald et al.

(10) Patent No.: US 7,763,298 B2
(45) Date of Patent: Jul. 27, 2010

(54) METHODS OF MAKING VACUUM PACKAGED FOOD PRODUCTS

(75) Inventors: William E. Archibald, Atascadero, CA (US); Dean F. Funk, Brooklyn Park, MN (US); Robert J. Harrison, Champlin, MN (US)

(73) Assignee: General Mills IP Holdings II, LLC., Minneapolis, MN (US)

( * ) Notice: Subject to any disclaimer, the term of this patent is extended or adjusted under 35 U.S.C. 154(b) by 0 days.

(21) Appl. No.: 11/975,656

(22) Filed: Oct. 19, 2007

(65) Prior Publication Data

US 2008/0057169 A1    Mar. 6, 2008

Related U.S. Application Data

(62) Division of application No. 10/374,004, filed on Feb. 25, 2003.

(51) Int. Cl.
*B65B 25/06* (2006.01)
(52) U.S. Cl. .................. 426/414; 426/106; 426/392; 426/658; 426/410; 426/512
(58) Field of Classification Search .............. 426/106, 426/549, 660, 392, 410, 412, 512, 658, 414
See application file for complete search history.

(56) References Cited

U.S. PATENT DOCUMENTS

| | | | |
|---|---|---|---|
| 1,290,836 A | 1/1919 | Jones | |
| 1,458,585 A | 6/1923 | McCrosson | |

(Continued)

FOREIGN PATENT DOCUMENTS

EP    861603    9/1998

(Continued)

OTHER PUBLICATIONS

Potter et al Food Science 5th Edition Chapman and Hall 1995. pp. 478-481 and 496.*

(Continued)

*Primary Examiner*—Lien Tran
*Assistant Examiner*—Kelly Bekker
(74) *Attorney, Agent, or Firm*—John A. O'Toole; Barbara Clark

(57) ABSTRACT

A packaged food article, comprising a package maintaining at least a partial vacuum and having at least a portion being flexible; and at least one food piece disposed therein in the form of a shaped solid composite mass comprising an aggregate base having a quantity of food particles, wherein at least a portion of the food piece is in conforming contact with the flexible package portion and wherein the food piece has a water activity of 0.45 or less is disclosed. In one embodiment the packaged food article further comprises binder. In most embodiments, the binder comprises 25% or less, by weight, of the product, resulting in a product that is less sweet than other grain-based handheld food products, yet retains a chewy texture. In another embodiment, highly oxygen sensitive ingredients are used as a food ingredient. The resulting product has a very long shelf life, maintaining its full color, texture and flavor for at least 3 months, up to about 12 months. Additionally, most of the frangible ingredients remain whole and there is minimal, if any, waste during manufacturing as no trimming is required.

24 Claims, 5 Drawing Sheets

U.S. PATENT DOCUMENTS

| | | | |
|---|---|---|---|
| 2,225,336 A | 12/1940 | Foster et al. | |
| 2,370,419 A | 2/1945 | Ray | |
| 2,478,438 A | 8/1949 | Thompson et al. | |
| 2,956,383 A | 10/1960 | Gausman | |
| 3,246,990 A | 4/1966 | Thompson et al. | |
| 3,582,363 A | 6/1971 | Jones | |
| 3,608,709 A | 9/1971 | Pike | |
| 3,708,308 A | 1/1973 | Bedenk et al. | |
| 3,753,728 A | 8/1973 | Bedenk et al. | |
| 3,853,999 A | 12/1974 | Kentor | |
| 3,903,308 A | 9/1975 | Ode | |
| 3,989,853 A * | 11/1976 | Forkner | 426/305 |
| 4,027,456 A | 6/1977 | Wilson | |
| 4,055,669 A | 10/1977 | Kelly et al. | |
| 4,451,488 A | 5/1984 | Cook et al. | |
| 4,517,210 A | 5/1985 | Fogel | |
| 4,672,793 A | 6/1987 | Terlizzi et al. | |
| 4,689,238 A | 8/1987 | Hitchner | |
| 4,750,534 A | 6/1988 | Hirasawa et al. | |
| 4,792,457 A | 12/1988 | Brna et al. | |
| 4,918,906 A | 4/1990 | Ako et al. | |
| 4,927,689 A | 5/1990 | Markiewicz | |
| 4,964,259 A | 10/1990 | Ylvisaker et al. | |
| 5,024,996 A | 6/1991 | Ringe | |
| 5,137,745 A | 8/1992 | Zukerman et al. | |
| 5,171,950 A | 12/1992 | Brauner et al. | |
| 5,296,253 A | 3/1994 | Lusas et al. | |
| 5,342,635 A | 8/1994 | Schwab et al. | |
| 5,352,466 A | 10/1994 | Delonis | |
| 5,413,805 A * | 5/1995 | Delpierre et al. | 426/620 |
| 5,451,419 A | 9/1995 | Schwab et al. | |
| 5,473,866 A | 12/1995 | Maglecic et al. | |
| 5,487,940 A | 1/1996 | Bianchini et al. | |
| 5,500,303 A | 3/1996 | Anderson | |
| 5,512,308 A | 4/1996 | Mishkin et al. | |
| 5,523,109 A | 6/1996 | Hellweg et al. | |
| 5,534,109 A | 7/1996 | Fujiwara et al. | |
| 5,558,930 A | 9/1996 | DiPoto | |
| 5,728,439 A | 3/1998 | Carlblom et al. | |
| 5,804,235 A * | 9/1998 | Altschul | 426/104 |
| 5,887,409 A | 3/1999 | Leal Pereira Da Silva et al. | |
| 5,942,320 A | 8/1999 | Miyake et al. | |
| 5,954,433 A | 9/1999 | Yeager | |
| 5,977,212 A | 11/1999 | Ebner et al. | |
| 6,010,732 A | 1/2000 | van Lengerich et al. | |
| 6,037,022 A | 3/2000 | Adur et al. | |
| 6,062,467 A | 5/2000 | Ours et al. | |
| 6,074,677 A | 6/2000 | Croft | |
| 6,213,645 B1 | 4/2001 | Beer | |
| 6,233,907 B1 | 5/2001 | Cook, Jr. et al. | |
| 6,245,367 B1 | 6/2001 | Galomb | |
| 6,251,450 B1 | 6/2001 | Giacoman | |
| 6,261,615 B1 | 7/2001 | Sumpmann et al. | |
| 6,312,745 B1 | 11/2001 | Durance et al. | |
| 6,558,718 B1 | 5/2003 | Evenson et al. | |
| 6,773,734 B2 | 8/2004 | Sirohi et al. | |
| 2002/0102330 A1 | 8/2002 | Schramm et al. | |

FOREIGN PATENT DOCUMENTS

| | | |
|---|---|---|
| GB | 1290836 | 9/1972 |
| JP | 05030929 | 2/1993 |
| WO | WO-98/12110 | 3/1998 |
| WO | WO-00/42867 | 7/2000 |
| WO | WO-01/22835 | 4/2001 |
| WO | WO-02/11554 | 2/2002 |

OTHER PUBLICATIONS

"U.S. Appl. No. 09/945,318 Response filed Mar. 11, 2008 to Final Office Action mailed Dec. 17, 2007", 10 pages.

"U.S. Appl. No. 10/374,004 Response filed Mar. 31, 2008 to Non Final Office Action mailed Dec. 31, 2007",18 pages.

"U.S. Appl. No. 09/945,318 Final Office Action mailed Dec. 17, 2007", 7 pgs.

"U.S. Appl. No. 10/374,004, Non Final Office Action mailed Dec. 31, 2007", 14 pgs.

U.S. Appl. No. 09/945,318 Advisory Action mailed Jun. 24, 2004, 3 pgs.

U.S. Appl. No. 09/945,318 Advisory Action mailed Sep. 17, 2005, 6 pgs.

U.S. Appl. No. 09/945,318 Final Office Action mailed Feb. 2, 2004, 19 pgs.

U.S. Appl. No. 09/945,318 Final Office Action mailed May 19, 2005, 26 pgs.

U.S. Appl. No. 09/945,318 Non Final Office Action mailed Aug. 1, 2003, 13 pgs.

U.S. Appl. No. 09/945,318 Non Final Office Action mailed Oct. 26, 2004, 23 pgs.

U.S. Appl. No. 09/945,318 Response filed Jan. 26, 2005 to Non Final Office Action mailed Oct. 26, 2004, 22 pgs.

U.S. Appl. No. 09/945,318 Response filed Jun. 2, 2004 to Final Office Action mailed Feb. 2, 2004, 33 pgs.

U.S. Appl. No. 09/945,318 Response filed Aug. 19, 2005 to Final Office Action mailed May 19, 2005, 23 pgs.

U.S. Appl. No. 09/945,318 Response filed Nov. 3, 2003 to Non Final Office Action mailed Aug. 1, 2003, 28 pgs.

U.S. Appl. No. 10/374,004 Advisory Action mailed Aug. 15, 2006, 3 pgs.

U.S. Appl. No. 10/374,004 Advisory Action mailed Oct. 2, 2007, 3 pgs.

U.S. Appl. No. 10/374,004 Final Office Action mailed May 30, 2007, 7 pgs.

U.S. Appl. No. 10/374,004 Final Office Action mailed May 31, 2006, 11 pgs.

U.S. Appl. No. 10/374,004 Non Final Office Action mailed Dec. 1, 2006, 13 pgs.

U.S. Appl. No. 10/374,004 Non Final Office Action mailed Dec. 14, 2005, 16 pgs.

U.S. Appl. No. 10/374,004 Response filed Feb. 27, 2007 to Non Final Office Action mailed Dec. 1, 2006, 23 pgs.

U.S. Appl. No. 10/374,004 Response filed Mar. 14, 2006 to Non Final Office Action mailed Dec. 14, 2005, 20 pgs.

U.S. Appl. No. 10/374,004 Response filed Jul. 31, 2006 to Final Office Action mailed May 31, 2006, 22 pgs.

U.S. Appl. No. 10/374,004 Response filed Sep. 14, 2007 to Final Office Action mailed May 30, 2007, 29 pgs.

"Corn Syrup, Hormel Foods Glossary.", http://www.hormel.com/kitchen/glossary.asp?id=33201. Apr. 23, 2003 Date obtained from www.web.archive.com, 1 pg.

"Food and Beverage: Organic BriesSweet(tm) Tapioca Syrup 28DE., Briess Malt and Ingredients Company", http://www.briess.com/foodbev/productsprganics.shtml, 1 pg.

Betsy AT TLK, "Recipe: Trail Mix Variations", http://www.recipelink.com/cgi/msgbrd/msg_script.pl?printer=1&board=31&thread9022, (Feb. 28, 2002),3.

Francis, Frederick J., "Food Science and Technology", *A Wiley-Interscience Publication, John Wiley & Sons, Inc. Encyclopedia of Food Science and Technology, Second Edition,*, vol. 1,(2000),2622-2625.

Igoe, Robert, "Dictionary of Food Ingredients", *4th Edition, Springer-Verlag*, (2001),66-67.

Sacharov, Stanley , "Increasing food shelf-life by vacuum and gas packaging", *Food in Canada*, (May 1970),29-30,62.

"U.S. Appl. No. 09/945,318, Response filed Nov. 17, 2008 to Non Final Office Action mailed May 30, 2008", 9 pgs.

"U.S. Appl. No. 10/374,004, Final Office Action mailed Jul. 2, 2008", 9 pgs.

"U.S. Appl. No. 10/374,004, Non Final Office Action mailed Mar. 4, 2009", 20 pgs.

"U.S. Appl. No. 10/374,004, Response filed Dec. 1, 2008 to Final Office Action mailed Jul. 2, 2008", 22 pgs.

"U.S. Appl. No. 10/374,004, Response filed Jul. 6, 2009 to Non Final Office Action mailed Mar. 4, 2009", 22 pgs.

"U.S. Appl. No. 09/945,318 Final Office Action mailed Dec. 31, 2008", 6 pgs.

* cited by examiner

METHODS OF MAKING VACUUM PACKAGED FOOD PRODUCTS

RELATED APPLICATIONS

This application is a divisional of U.S. application Ser. No. 10/374,004 filed Feb. 25, 2003, still pending which is incorporated herein by reference in its entirety.

FIELD

This invention relates to food products, and, in particular, this invention relates to vacuum packaged food products and methods of making same.

BACKGROUND

Ready-To-Eat (RTE) cereals are popular food products typically consumed with milk. For added convenience, there have been many efforts in the food industry to develop portable ready-to-eat cereal food products in bar form. Many such bar products are currently commercially available, such as the familiar granola bar. Such products are distinguished from cookies, dessert bars or like products by absence of a flour-based batter as a structuring agent and are not typically prepared by baking or other finish cooking step. Rather, a loose mixture of RTE cereal particles is admixed with a high proportion of a sugar syrup binder. The admixture is then pressed into slabs, cut into individually sized and shaped pieces and packaged.

While convenient and useful, such cereal bar products can suffer from one or more consumer complaints. Foremost, conventional cereal bar products can be too sweet in taste for some adult consumers. The excessive sweetness is due to the need to employ high proportions of the sugar syrup binder needed to provide a product that is a solid mass suitable for forming into a shaped form that retains its shape, e.g., bar or square that retains its form. For certain nutrition conscious consumers, e.g., diabetics, high sugar(s) content is also undesirable.

Of course, efforts have been made to provide products in shaped form, such as bars that comprise puffed cereal pieces with lesser quantities of sugar slurry binder. However, as the amount of sugar syrup or slurry binder is reduced, the formulations, after cooling to set the binder, become progressively a mixture of softer or more loosely bound particles until forming a mere quantity of loosely bound particulates rather than a solid mass.

Still another approach to providing a shaped food product having enough binder to provide a solid mass, but with reduced sweetness, is to substitute a portion of the more sweet binding sugars with less sweet carbohydrates equivalents, such as maltose sugars and/or maltodextrins. However, while binders comprising sugar replacements are less sweet, such products can exhibit other undesirable attributes. For example, products comprising high levels of maltodextrin as a binder constituent can be quite hard and glassy in texture. Also, even though the products are firm and less sweet, they can be objectionable as being too high in sugars and too low in the cereal component.

Yet another technique for providing shaped or bar products of reduced binder levels is to use compression or compaction to force the particulates closer together. While the mixture of cereal and binder is still warm and soft, a mass of cereal base and binder can be pressed by compression rollers to form sheets. These sheets are allowed to cool and harden and are then slit into suitably sized pieces such as by cutting longitudinally into ribbons and then transversely into individual pieces.

While useful for modest reductions in binder, such techniques (especially when a puffed or otherwise frangible cereal base is employed) can result in high percentages of product that are broken and/or crushed or deformed. Products with so few, if any, remaining whole cereal pieces suffer from another consumer complaint regarding appearance. Furthermore, the cutting step results in relatively sharp edges or surfaces. Such products further have flat top and bottom surfaces due to the compression step, which, together with the sharp edges, impart a harsh and undesirably mechanical appearance aspect to the products, which is another visual or appearance complaint from consumers.

Still another consumer complaint is that such products are too hard or tough in texture. While softer products, e.g., soft and chewy granola bars, are well known, such products are either sticky due to required sugars formulation and amount of binder or otherwise require use of a "non-natural" humectant ingredient, such as glycerol or other polyhydric alcohol. Compaction (described above) can also aggravate the tough or heard eating quality.

These problems are difficult to overcome with unexpanded cereal products, such as granola bars, comprising unpuffed oat flakes or similar type products comprising slightly puffed cereal flakes such as corn or wheat flakes (e.g., Golden Grahams® bars). These problems are even more severe for products comprising puffed pieces such as whole grain oat "O" Cheerios® pieces or puffed spheres e.g., Kix® puffed corn pieces. Not only are such puffed shapes more fragile and more easily prone to damage, but also the individual pieces are larger and are more rounded.

In still other variations, a higher moisture binder is employed to form sheets or pieces of the particulates. These forms can then be baked or dried to remove the excess water to form bars or pieces. Again, while useful, such baking or drying steps can require extra equipment and steps to practice product preparation and can also adversely affect heat sensitive additives such as dried fruits or chocolate chips.

Another taste and appearance complaint is that while such current cereal bar products often contain dried fruit pieces, such as raisins, the dried fruit lack taste and appearance appeal. There have also been several attempts to include highly oxygen sensitive ingredients, such as freeze-dried fruits, in these products. However, such products rapidly lose their quality upon oxygen exposure.

Thus, there is a continuing need for new and improved portable food products that have an acceptable sweetness level, contain primarily unbroken pieces, and have an adequate shelf life.

SUMMARY

A packaged food article, comprising a package maintaining at least a partial vacuum, wherein at least a portion of the package is flexible; and at least one food piece disposed therein in the form of a shaped solid composite mass comprising an aggregate base having a quantity of food particles, wherein at least a portion of the food piece is in conforming contact with the flexible package portion and wherein the food piece has a water activity of 0.45 or less is disclosed. In one embodiment the packaged food article further comprises binder.

The shaped formed food product piece is useful as a component or intermediate for a packaged food product. In a particular embodiment, the low water activity binder is a sugar syrup. In most embodiments, the dry ingredients or "base" to low water activity binder ratio is at least 2:1 resulting in a finished product that is less sweet than other grain-based handheld food products, yet retains a shaped configuration until at least immediately prior to consumption. In another embodiment, the products comprise highly oxygen sensitive ingredients, such as fruits or dried fruits that retain high levels of oxygen sensitive flavor and/or color constituents for improved appearance and flavor without need of flavor and/or color enhancers.

The present invention also provides improvements in the vacuum packaged cereal products and methods of preparation that are described in commonly assigned co-pending U.S. Ser. No. 09/945,318, entitled "PACKAGE AND METHOD" (filed Aug. 31, 2001 by Knigge et al.), which is incorporated herein by reference. The present invention provides improvements in that it has now been found that vacuum packaging finds particular suitability for provision of formed cereal bar products of reduced binder levels to provide hand held cereal bars in contrast to the loose RTE cereals of the prior application. Also, the present invention contemplates the inclusion of highly oxygen sensitive cereal bar ingredients such as freeze dried fruit pieces.

Surprisingly, it has been found that such superior food products can be formulated and fabricated by methods of preparation that employ vacuum packaging to maintain bar integrity allowing for reducing, if desired, the levels of sugar syrup binder and that do not involve compaction, baking or cutting steps. Additionally, the vacuum packaging methods described herein can also be used for conventional food products, such as food products not having reduced levels of binder, thus eliminating steps previously thought to be essential in producing such products, e.g., depositing, forming, cooling, slitting, dividing, and so forth. Vacuum packaging also provides for greater freshness not only for whole grain ingredients but also especially for highly oxygen sensitive ingredients such as freeze dried fruit ingredients.

In one embodiment, the present invention provides a method of forming a vacuum packaged food product comprising preparing a workable composite mass containing a grain-based food ingredient and a low water activity binder and placing a quantity of the workable composite mass into a flexible packaging envelope. The process continues by applying a vacuum to the flexible packaging envelope and sealing the flexible packaging envelope to form a flexible sealed package. The process concludes by allowing the workable composite mass to cure within the flexible sealed package to form a vacuum packaged food product. The product can further be subdivided into desired portions prior to packaging. There is minimal product waste in the process of the present invention, as there is no trimming step required.

The present invention provides improvements in cereal bar products that address one or all of the consumer complaints noted above, by providing cereal bar products with lower sugar content and sweetness, high levels of intact cereal pieces, improved overall more "natural" appearance, and a texture that is not tough. The products can have a fresher flavor and appearance through extended room temperature storage. The resulting product has a very long shelf life, maintaining its full color, texture and flavor for at least 3 months, up to about 12 months, even in variations comprising oxygen highly sensitive ingredients such as freeze dried fruit.

DETAILED DESCRIPTION

Figure 1:
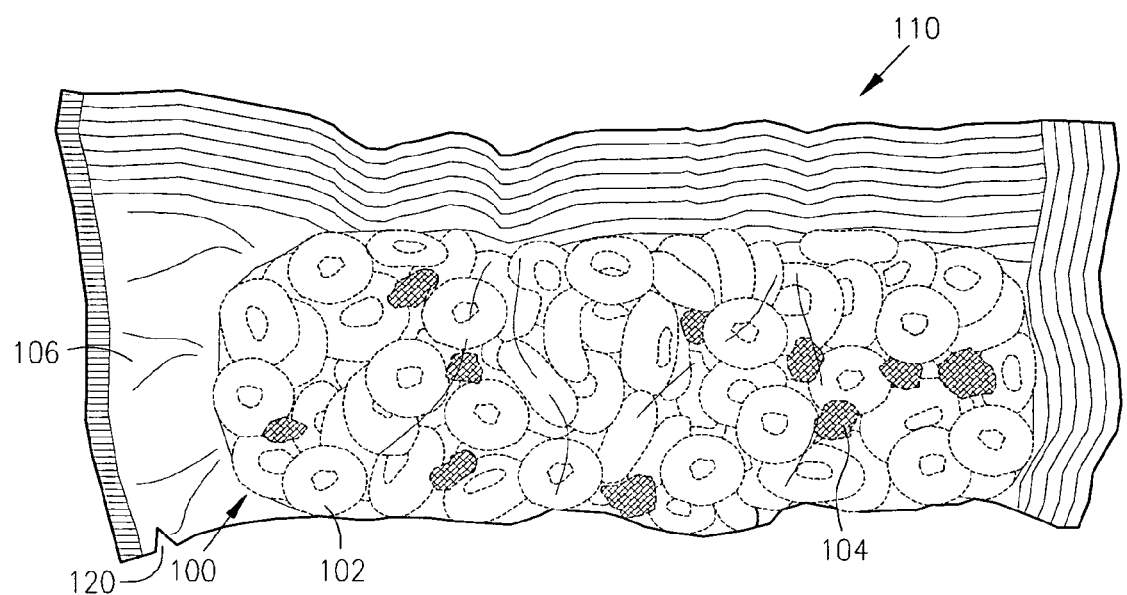
FIG. 1 is a schematic drawing of a vacuum packaged food product containing a cured food piece in one embodiment of the present invention.

In the following detailed description, reference is made to the accompanying drawings that form a part hereof, and in which is shown by way of illustration, specific embodiments in which the invention can be practiced. These embodiments are described in sufficient detail to enable those skilled in the art to practice the invention, and it is to be understood that other embodiments can be utilized. It is also to be understood that structural, procedural and system changes can be made without departing from the spirit and scope of the present invention. The following detailed description is, therefore, not to be taken in a limiting sense, and the scope of the present invention is defined by the appended claims and their equivalents.

Various terms used throughout the description are defined first, followed by a discussion of various vacuum packagable food product embodiments, including information on their compositions. The process for making the vacuum packaged food products is described next, followed by a brief conclusion highlighting some of the advantages of the various embodiments of the invention.

INTRODUCTORY DEFINITION

As used herein, the term "additive" is intended to encompass any type of food ingredient added to the food product at any time during manufacturing. A "topping" is one type of additive which typically stays on "top" of the end product, although a "topping" can also be applied as a "coating" such that it adheres to some or all of the end product, with or without the assistance of a carrier substance. Liquids in any form are also considered to be additives. Embodiments that discuss the use of "toppings" can also include the use of any type of "additive." Additives also include non-nutritive (non-carbohydrate) high potency sweeteners (such as aspartame, acesulfame K, Sucralose and saccharin) as well as carbohydrate-based sweeteners, and any other "carbohydrate" as defined below. Additives further include acids, bases, salts, buffering systems, chelating agents, antioxidants, antimicrobial agents, gases/propellants, and so forth. Additives further include nutrient and health additives such as vitamins, minerals, encapsulated biologically active components, nutraceuticals (defined below), dietary supplements, anti-oxidants, fibers, inulin, calcium carbonate, probiotic bacteria sprinkles (e.g., lactobacillus or acidophilus), energy additives, protein powders, powdered milk fractions, protein or satiety additives, herbs, aromatic substances, and other similar health-enhancing additives.

The term "nutraceutical" as used herein refers to edible materials having, or believed to have, medicinal effects. Nutraceuticals include the, ginseng and other herbs, St. John's Wort, wheat grass and barley grass and extracts of the grasses, soy-based estrogen analogs (isoflavones). Nutraceuticals can also be a source of vitamins, e.g., tocopherols, B vitamins and minerals and so on.

The term "color" or "coloring agent" as used herein refers to natural or uncertified colors from natural sources or certified colors for the effect of color. In one embodiment, the colors include dyes, certified aluminum laks or colors derived from a natural source. Coloring agents may also be water-based or oil-based or dry. Coloring agents may be primary colors, blends of colors or discrete mixtures of colors, such as confetti.

The term "compound coating" refers to a coating containing any fat other than cocoa butter. This is unlike "chocolate" which must contain cocoa butter.

The term "density" when used without qualification herein refers to "bulk density" of a component or composition.

The term "fat" as used herein is synonymous with the term "lipid" and refers to substantially all fats and oils and fat substitutes, including any animal or vegetable fat in solid or liquid form.

The term "flavor" or "flavoring" as used herein refers to an organoleptic agent in the form of an emulsion, concentrate, aqueous- or oil-soluble liquid or a dry powder, as well as any type of chunky piece or pieces that may be added to a mixture at any time in the process. Flavorings can also be considered additives and can include nuts, nut pieces, fresh fruits, dried fruits, fruit products, candies, marshmallows, "marbits," chocolates and chocolate products, and so forth. Flavorings further include any fruit flavors such as berry flavors, apple, cherry, plum, raisin, banana, pear, peach, figs, dates and so on. Flavorings may also include fats, salts, honeys, cheeses, frosting, powdered food products, sugar, sugar substitutes, gelatins and spices. Flavorings may also include colorings as well as any nut flavors as well as any sweet flavors such as chocolate, vanilla, caramel, butterscotch, lemon, malt, cinnamon, graham, coconut flavors, mint and so on. Flavorings additionally include any savory flavors such as all meat, game, fowl, fish, dairy, barbecue, smoke, pepper, spicy and vegetable flavors.

The term "light sensitive" refers to a food that reacts to the presence of visible light, resulting in degradation in desirable attribute over a relatively short period of time such as loss of color or flavor or development of an off flavor, e.g., rancidity. Some foods that are also "light sensitive" are also "oxygen sensitive," such as various dairy products, fruit and dried fruit, especially freeze dried fruit. However, if the exposure to oxygen is reduced or eliminated, the flavor and/or color degradation resulting from sensitivity to light will be minimized.

The term "oxygen sensitive" as used herein refers to a food that oxidizes in the presence of air. Foods containing free fatty acids, such as whole grains, for example, will react with any oxygen in the package environment, leading to oxidation. The resulting product is a peroxide, which reacts to form an aldehyde, or more specifically, hexanal. Hexanal is a marker for rancidity, and at one (1) ppm, rancidity is apparent to the average consumer. Other foods, such as fruits, also lose color or flavor in response to oxidation.

The term "highly oxygen sensitive" refers to oxygen sensitive ingredients that exhibit high rates of oxygen degradation or degrade even in low oxygen environments. Fruits and freeze-dried fruits especially lightly colored, with the exception of raisins, are examples of highly oxygen sensitive ingredients.

The term "aggregate" or "aggregate base" as used herein refers to a mixture of food pieces, i.e., particles (particulates). An aggregate is essentially a mixture of dry ingredients that can be held together (such as with a binder) to form a single food piece. An aggregate can comprise large pieces, up to about 10 to 12 mm (0.4 to 0.5 in), and in some instances up to about 20 mm (0.8 in), as well as small pieces, down to about two (2) mm (0.08 in), further including powders of yet smaller dimensions as is known in the art. Such powders can include corn starch comprised of particles having a size such that about 98% of the particles, by weight, can pass through a 100-mesh US screen. Powders can further include, but are not limited to, cinnamon dust, a cinnamon dust/sugar combination, maltodextrin, and the like. An aggregate can be a mixture of pieces having different sizes or can include pieces that are all about the same size. However, an aggregate will typically not contain more than about 20% of the particles in powder form. An aggregate can include grain-based particles, such as RTE-cereals, popcorn, crackers, pretzels, grain-based chips, savory seasoned snacks, and the like, as well as non-grain based particles that include, but are not limited to, dried whole fruits (e.g., raisins, dates, blueberries, peaches, raspberries, apricots, strawberries, cranberries, tropical [e.g., pineapple, papaya and mango], etc.), fruit parts (e.g., banana chips, apple chunks, etc.), dried fruit products (whether or not infused with sugar, glycerol, etc.), marshmallows, marshmallow bits (dried or moist), malted milk balls, chocolate and peanut butter chunks, chocolate (e.g., milk chocolate, dark chocolate, white chocolate, etc.), chocolate products (e.g., chocolate-coated raisins, chocolate-coated peanuts, etc.), nuts (e.g., walnuts, raisin nuts, pecans, peanuts, almonds, hazel nuts, macadamia nuts, etc.), shredded coconut, yogurt chips (e.g., vanilla, blueberry, strawberry), clusters of particulates (e.g., honey nut clusters), and so forth.

The term "cereal bar base" as used herein refers to one type of "aggregate base." The primary base ingredient in the "cereal bar base" is typically a grain-based dry food ingredient. In most embodiments, this is a RTE cereal, sometimes referred to as the "parent cereal." In some instances, the primary base ingredient is the only type of ingredient in the base. In other embodiments, other types of grain-based or non-grain based particles, as defined above, are also present in a "cereal bar base."

Vacuum Packagable Food Product Embodiments

The basic physical composition of the vacuum packaged food product is that of a solid conglomeration or single composite mass comprised of a major portion of an aggregate base and, in most embodiments, a minor portion of a low water activity binder that can be formed into a desired shape and size using vacuum packaging. The package itself can be characterized as an "active package" as opposed to a "passive package." Specifically, the active package is designed to contribute directly to the process of forming the final product by supplying pressure and dynamic forces to an intermediate uncured conglomeration. Essentially, the active package, over time, urges the conglomeration together. The conglomeration, in turn, progresses over time from a warm and plastic deformable (uncured) mass to a cooled and cured or set final product.

FIG. 1 shows one embodiment of a vacuumed packaged food product 110 comprising a food quantity or piece (hereinafter "cured food piece") 100 disposed within a package, such as the pouch 106 shown in FIG. 1. The pouch 106 depicted is fabricated at least in part from a flexible packaging material such as a packaging film. The cured food piece 100 comprises an aggregate base having one or more dry ingredients. In the embodiment shown in FIG. 1, the cured food piece 100 comprises two dry ingredients, namely a first or primary "grain-based" base ingredient (hereinafter "primary base ingredient") 102 and a second base ingredient 104.

The packaging film can be any suitable material, but needs to be sufficiently strong to contain the contents within and remain puncture resistant. The packaging film further needs to have a sufficiently low oxygen permeability, be heat sealable and be able to maintain a vacuum over an extended shelf life. Useful packaging films are well known and the skilled artisan will have no difficulty in selecting commercially available films for use herein.

The packaging film can be clear, translucent or opaque or have portions that are clear. The exterior portion of the pouch 106 can also be textured, e.g., dimpled, if desired. In a particular embodiment, each cured food piece 100 is individually "pouched" in an opaque flexible metallized film known in the art. In one embodiment, an opaque film of the type used for vacuum packaged coffee is used. Such films typically have an additional inner or intermediate foil layer for added strength. In another embodiment, the clear materials can include materials such as a ceramic-coated polyester film. The advantage of using a clear material is that it allows the consumer to view the product prior to opening, although a viewing window can be provided in other packaging materials.

In one embodiment, the pouch 106 is fabricated from packaging film that is a single layer formed of a film or a single sheet. In another embodiment, the pouch 106 is fabricated from other packaging film such as a laminate, a co-extrusion, or a combination thereof. Preferably, the packaging material is selected to be of low oxygen permeability. Typical low oxygen permeable packaging materials have an oxygen permeability of no greater than about 0.31 cc/100 m²/24 hr. In a further embodiment, the laminate has an oxygen permeability of no greater than about 0.2 cc/100 m²/24 hr. The laminate can be a flexible material comprising a polymer substrate selected from the group consisting of polyethylene (PE), polypropylene (PP), polyethylene terephthalate (PET), and polylactic acid (PLA), an oxygen barrier layer, and a moisture barrier layer comprising a metallized polymeric composite. The laminate can further comprise a film or ceramic including a component selected from the group consisting of oxygen scavengers and antioxidants. In one embodiment, oxygen scavengers are incorporated into the substrate, the oxygen scavengers being selected from the group consisting of light activated oxygen scavengers and conventional oxygen scavengers. In one embodiment, the laminate is a flexible material comprising a layer of aluminum oxide coated polyethylene, a layer of polyester, a layer of glass or ceramic, and a polyester sealant interior of the aluminum oxide coated polyethylene layer. In a further embodiment, the laminate comprises a moisture barrier coating exterior of an oxygen barrier coating.

In one embodiment, the pouch 106 can include a means for assisting or controlling the opening of the pouch 106, such as a scoring notch 120. In another embodiment, the pouch 106 can include perforations that are torn apart to facilitate controlled opening of the pouch 106. In other embodiments, the pouch 106 can include any type of recloseable opening (not shown), which can be reclosed by adhesive, zipper, clip, tin tie, or the like. In still another variation (not shown), the pouch 106 can be fabricated with a stand feature at one end to allow for display in a vertical orientation without need for additional packaging, e.g., an exterior carton.

The vacuum packaged food product 110 is desirably free of any added controlled packaging headspace gas, such as any type of gas that is added to the package after the vacuum has been applied. Such gases include nitrogen, nitrous oxide, neon, argon or mixtures thereof to maintain structure and an interior environment having less than about one (1) ppm hexanal. Such gases are not necessary in the present invention as the pouch 106 is form-fitting around the cured food piece 100 and the contents are further sufficiently crush resistant and do not require added cushion.

Individual vacuum packaged food products 110 can be sold, such as in vending machines or convenience stores. If desired, any number of individually vacuum packaged food products 110 can be packaged in a secondary container or carton, e.g., four (4)-20 pouches, for distribution or as consumer products. Use of vacuum packaging maximizes available space, both when the product is shipped and on store shelves. In one embodiment, a single vacuum packaged food product 110 is placed in an individual carton, such as for use in fast food restaurants, airplanes, and so forth. It is also possible to ship individual vacuum packaged food products 110 without placing them in individual cartons. In a particular embodiment, small, regular or king-sized food products are packaged for individually dispensing in a vending machine. In one embodiment, six (6) vacuum packaged food products 110 are packaged together in a consumer-sized container that is smaller than a 6-pack of conventional cereal bars. In another embodiment, less than six (6) vacuum packaged food products 110 are placed in a carton. In yet another embodiment, seven (7) to 12 vacuum packaged food products 110 or more are placed in a carton. In one embodiment, the consumer-sized container is about 2,000 to 5,000 cc and holds more than one vacuum packaged food product 110. In another embodiment, a large slab of food product such as about 25 cm by 35 cm (about ten (10) in by 14 in), is packaged in a flexible metallized film for use in a food service facility where it is cut into individual servings to be sold at a later time.

The pouch 106 can be preprinted with product information, or can further comprise a pressure sensitive label affixed to the exterior portion of the pouch, the label providing product information, including nutritional information. The label for the vacuum packagable food product can further include a statement that each food product contains reduced binder amounts. The details on the nutritional content of the food products can be presented both on the outside carton as well as on each individually wrapped layered food product. In one embodiment (not shown), the pouch 106 includes a coupon or premium, which can be located or printed on or mounted upon the exterior portion, or alternatively can be provided within the pouch 106. In another variation the pouch 106 can include a second separate compartment in which the coupon is located.

Figure 2A:
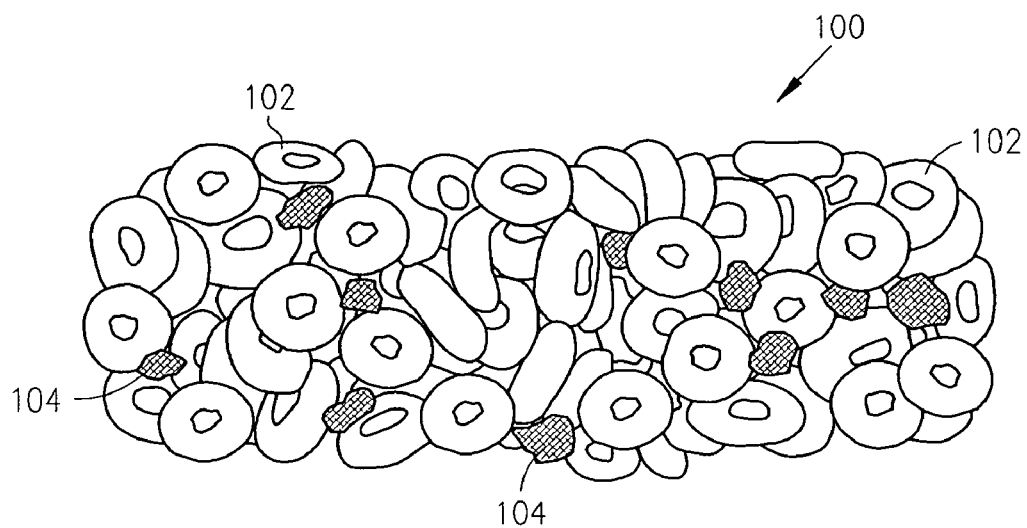
FIG. 2A is a schematic drawing of the cured food piece of FIG. 1 after being removed from the package in one embodiment of the present invention.

FIG. 2A depicts the cured food piece 100 after having been removed from the packaging film. As noted above, in the embodiments shown in FIGS. 1 and 2A, the cured food piece 100 comprises an aggregate base containing the primary base ingredient 102 and the second base ingredient 104. The primary base ingredient 102 is a particle characterized by a larger average particle size and the second base ingredient 104 is a particle characterized by a smaller average particle size. Specifically, the second base ingredient 104, i.e., "smaller pieces," nests within the interstices formed by a quantity of the primary base ingredient 102, i.e., "larger pieces." In most embodiments, the aggregate base is a cereal bar base having a primary base ingredient 102 comprised of RTE cereal pieces. In certain variations the RTE cereal pieces have a more complex shape, such as the "O" or ring shaped pieces shown in FIGS. 1 and 2A, rather than the simpler, generally irregularly rounded pieces comprising the second base ingredient 104. FIG. 2A further depicts that, in most embodiments, the cured food piece 100 is not a "sheeted" product, and thus has no generally straight-cut or flat surfaces. Rather, in a preferred form at least one surface is rounded and in more preferred embodiments all surfaces are rounded and not sheeted or flat and/or all edges or ends are rounded and uncut.

An additional advantage of combining larger, more fragile puffed RTE cereal pieces with the smaller nested dry ingredients is that finished bar products exhibit surprisingly greater crush strength when vacuum packaged herein compared to like quantities of the puffed RTE cereal pieces without the nested dry ingredients.

The primary and second base ingredients, 102 and 104, respectively, can be combined in any suitable ratio. In one variation, the weight proportions of larger to smaller pieces are substantially equivalent, i.e., combined in a ratio of 1:1. In another embodiment, the two dry ingredients are combined in a weight ratio of larger sized to smaller sized pieces in a weight ratio of about 2:1, 3:1, 4:1, and so forth. In other embodiments, the dry ingredients are combined in a ratio of from about 1:5 to 1:30. Similarly, in embodiments using more than two dry ingredients in the base, the ratios can be at any desired levels. In a particular embodiment RTE cereal pieces and dried fruit pieces are combined in a ratio of about 20:1.

As shown in both FIGS. 1 and 2A, the cured food piece 100 has a substantially oblong shape. While the depicted piece is more rectangular, product shapes that are more cylindrical are also contemplated herein. However, as can be seen, the edges of the food product are not straight, as none of the six surfaces have been straight or knife-cut. In an exemplary embodiment, the cured food piece 100 piece weighs about 100 g and has a dimensions of about nine (9) to 13 cm (about 3.5 to five (5) in) long, about 3.2 to four (4) cm (about 1.25 to 1.6 in) wide and about 0.9 to 3.2 cm (about 0.3 to 1.25 in) thick. FIG. 2A is not necessarily drawn to scale and does not necessarily represent the actual density or thickness of the product, nor the actual proportion of the components in the cured food piece 100.

In another variation (not shown), the cured food piece 100 is more square-shaped yet nonetheless has neither flat surfaces or cut edges. In another variation, the cured food piece 100 is substantially round or oval-shaped. In yet another shape variation, the cured food piece 100 is substantially ring-shaped with a hole of any suitable diameter in the center. One advantage of having a substantially "round" food piece and package, is that shelf space can be maximized. In another embodiment, the cured food piece 100 has a substantially log shape. In yet another embodiment, the cured food piece 100 has an irregular shape, with a variable thickness, having the appearance of a slightly flattened composite mass. Although cutting is not necessary, if desired, some or all of the surfaces can be cut to form any of the aforementioned shapes more precisely.

In one less preferred embodiment, the cured food piece 100 is a cut food product that is cut into bite-size pieces. Such a food product can be any suitable shape, such as any type of simple or complex shape. This includes regular geometric shapes (e.g., squares, rounds, triangles, hexagonals, tubes, and so forth) and irregular shapes, which can be patterned (e.g., figurines, animals, trees, holiday shapes, stars, pillows, twists, wagon wheels, etc.) or unpatterned, such as a nugget shape. Many of the geometric shapes, such as hexagonal, and various combinations of regular and irregular shapes (e.g., crab, palm tree and bird), can be interlocked together or "tessellated" such that when cut, there is no web or waste left over.

As noted above, the "base" of the cured food piece 100 can, in some embodiments, comprise at least two dry ingredients, namely the larger primary base ingredient 102, e.g., parent cereal, and the smaller second base ingredient 104, such as dried fruit. In one embodiment, the second base ingredient 104 comprises more than one dry ingredient. A "dry" ingredient is a food ingredient having a water activity of less than about 0.4 and can range as low as about 0.1, such as for particular dried RTE cereal pieces. Such dry ingredients can includes both frangible food ingredients, such as RTE cereal pieces, and non frangible ingredients or products, e.g., dried fruit, nut pieces, chocolate chips or other candies, etc.

The frangible food ingredient(s) can be selected from a wide variety of ingredients, including, but not limited to, puffed RTE cereals (e.g., spheres, o-rings fabricated from dried cooked cereal doughs, and the like), including puffed rice pieces, or unpuffed cereal pieces (e.g., shreds, flakes, biscuits, squares and mixtures thereof, etc.) as well as other grain-based unpuffed foods (e.g., chips, pretzels, crackers, etc.), further including protein pieces (e.g., texturized vegetable protein (TVP) pieces) as well as flake grinds, nuts, nut pieces, granola pieces, nuggets, marshmallows, dried marshmallow bits (marbits), candies, candy pieces, cookies, cookie pieces, chocolates and chocolate products, including white and milk chocolates (e.g., chocolate chips, candy bars, etc.), other types of edible particulates (e.g., peanut butter chips, butterscotch chips, etc.), and the like, as well as "popped" foods such as popcorn. In most embodiments, at least one of the dry ingredients is supplied by a grain-based food cooked cereal dough or oat flakes, although the invention is not so limited.

The puffed pieces of cooked cereal dough can be prepared by conventional hot air or gun puffing to provide low fat cereal pieces as are generally used as RTE cereal products. In other less preferred variations, all or a portion of the puffed cooked cereal dough pieces can be prepared by deep fat frying to provided fat containing puffed cereal pieces. The dried cooked cereal dough-based material can also take on any of a variety of shapes as noted above, including o-rings, flakes, shreds, biscuits, rings, spheres, squares, rounds, triangles, convex-shapes, hexagonals, tubes, cornucopia, oblongs, pillows, and so forth, including any other desired shape discussed above in relation to the possible shapes for the food products themselves. The pieces themselves can be as large or small as desired, provided the product can still be produced with minimal or no breakage of the pieces. Very large pieces, such as those in excess of about seven (7) mm diameter, are more easily broken, and are not as practical in most embodiments. In a preferred embodiment, the cereal-based pieces have a mean particle size of about give (5) mm to about eight (8) mm.

In particular embodiments, the primary base ingredient 102 can be any known and popular RTE cereal, such as any type of Cheerios® (e.g., regular Cheerios®, Apple Cinnamon Cheerios®, Honey Nut Cheerios®), any type of Chex® (e.g., Honey Nut Chex®, Wheat Chex®, Rice Chex®, Corn Chex®, Bran Chex®), Cocoa Puffs®, Cinnamon Toast Crunch®, Oatmeal Raisin Crisp®, Wheaties®, Total®, Trix®, Kix®, generic substitutes for these and other RTE cereal products, various combinations of one or more cereal types, and so forth.

RTE cereal is an excellent source of many nutrients, including complex carbohydrates, protein and fiber. In one embodiment, the cereal pieces used comprise about one (1) to two (2) g of declared fiber or about 2.5% to about four (4)%, by weight, of the final product. In one embodiment, the RTE cereal is modified to increase or decrease fiber or other ingredients. For example, additional raisins can be added as the secondary base ingredient 104. In another embodiment, a sugar or other flavored coating, i.e., slurry coating, is added to the outside of the RTE cereal. A sugar coating is used as a flavoring, but can also serve to improve shelf life and texture. In yet another embodiment, an "oat-predominant" (greater than 50% oats dry weight basis) cereal base can be replaced with an "oat-containing" (less than 50% oats dry weight basis) cereal base. An "oat-containing" formulation has known advantages relating to shelf life, since oats are known to lose freshness sooner than other grains due to their lipid content. It is also possible to substitute or add any number of other grains into the cereal base, including rice, corn, sorghum, rye, wheat, barley, and so forth, in any suitable ratio, depending on the particular application. In one embodiment, the RTE cereal comprises about 20 to 25% by weight of the food product.

In one embodiment, the base (either the primary and/or secondary base ingredient, 102 and/or 104, respectively) is comprised of any grain-based material, at least a portion of which comprises a whole grain selected from the group consisting of whole grain oats, whole grain rice, whole grain corn (maize), whole grain rye, whole grain wheat, and mixtures thereof. The grain-based material can further comprise soybean flour. In one embodiment, pretreated oat flour, as is known in the art, is used in the grain-based material.

As noted above, another type of dry ingredient useful herein is a cooked extruded high-protein and rice expanded or puffed pieces. Such an ingredient can be used as either the primary base ingredient 102 and/or the secondary base ingredient 104, as desired, and depending in large part on size in relation to other ingredients present. Rice flour is admixed with soy flour or soy protein flour to provide puffed protein bearing pieces having a crispy texture that can be added to the other dry ingredients. Further, since rice tastes relatively bland, there is no off-flavor to interfere with the flavor of the other dry ingredients. In one embodiment, the high-protein rice pieces are made by incorporating soy protein in extruded rice pieces at very high levels of about 50% or higher. In a particular embodiment, high-protein soy/rice pieces are obtained from Ringger Foods, Gridley, Ill. or Du Pont Protein Technologies International (PTI) in St. Louis, Mo. The soy/rice pieces can be any suitable size and shape. It is known that the size and shape of the soy/rice pieces can vary depending on manufacturing conditions, machine die plates, formulation, and so forth. In one embodiment, the soy/rice pieces have an elongated oval shape. In another embodiment, the pieces have a variety of diameters ranging from about two (2) mm to about eight (8) mm. In embodiments in which this ingredient is used as a secondary base ingredient 104, the various sizes act as fillers between other, larger dry ingredients of the primary base ingredient 102. The density of the pieces can also vary depending on the particular type of pieces used, method of producing the pieces, and so forth. In one embodiment, the bulk density of the soy/rice pieces range from about 10 to 30 g/100 cc (about 175 to about 475 g/100 in$^2$). In a particular embodiment, soy crisp rice pieces having a bulk density of about 15 to 25 g/100 cc (about 300 to 400 g/100 in$^2$) are used. In one embodiment, the soy/rice pieces comprise about one (1) to 12%, by weight, of the final product.

The second base ingredient 104 can, and in certain preferred embodiments does, include highly oxygen sensitive ingredients such as fruit and dried fruit, including freeze-dried fruit. Freeze drying is often used to prepare high quality dried materials such as fruits that exhibit higher levels of flavor, aroma and/or color resulting from the gentler dehydration that freeze drying provides. Freeze-dried fruit ingredients are substantially more costly than other dried fruit ingredients not only due to higher end product qualities but also because of the cost and difficulty of the freeze-drying operation itself. An additional advantage of vacuum packaging is that the fresh aroma of the ingredients are retained for at least 3 months, up to about 12 months after packaging, thus enhancing the enjoyment of the food product for an extensive period of time. This is particularly true for highly oxygen sensitive ingredients, which retain a particularly noticeable fresh food smell. Also, current consumer trends favor cereal-based products that contain dried strawberry, raspberry and/or cranberry pieces. As each of these popular dried fruit pieces are particularly sensitive to oxygen degradation, the present invention finds particular suitability for use for those product executions that comprise on or more of these dried fruit ingredients. In still other embodiments, the base can comprise pieces of dried fruit foams (see, for example, U.S. Pat. No. 5,451,419 "DRIED FOOD FOAM PRODUCTS" issued Sep. 19, 1995, commonly assigned and incorporated herein by reference).

In one embodiment, pieces of a single type of RTE cereal and highly oxygen sensitive ingredient comprise the aggregate base as the primary base ingredient 102 and secondary base ingredient 104, respectively. In a particular embodiment, the highly oxygen sensitive ingredient comprises about two (2) to 10%, by weight, of the food product. In other embodiments, there are three or more dry ingredient types in the aggregate base, which can include other types of RTE cereal pieces and/or highly oxygen sensitive ingredients and/or a third type of ingredient, such as any of the dry ingredients noted above.

In a particular embodiment, the base can optionally further comprise grain-based puffed dried spherical dots or pellets about one (1) mm in diameter that add a crunchy texture to a slurry. When added to a fruit slurry, the resulting product can be referred to as a "crispy fruit." See commonly assigned and co-pending U.S. Ser. No. 10/209,707, entitled "FOOD PRODUCT AND METHOD OF PREPARATION" (filed Aug. 1, 2002 by Dean F. Funk et al), which is incorporated herein by reference. Such products can additionally or alternatively be added into any filling or topping that is present.

If desired, up to about 15% of the dry base ingredient can be supplied by cereal fines, i.e., smaller sized ground or broken particles that are an underutilized by-product of RTE cereal production. An advantage of the present invention is that such cereal fines can be added to provide characterizing flavor and color as well as to facilitate agglomeration of the composite mass into a food bar.

While the invention finds particular suitability for use to provide RTE cereal and grain-based snack products in bar form comprising puffed pieces of cooked cereal doughs and comprising various RTE cereal and/or snack food added particulates such as dried fruits and nuts for human consumption, the invention can also be used to provide pet or animal food products. Particularly for domestic companion animals such as cats and dogs, the base pieces can comprise puffed grain based base pieces that include higher levels of meat and meat by products or other sources of protein. It will be appreciated that such products can also be fortified with or formulated to include fat and/or fiber sources to provide complete animal rations. Such products generally will exhibit substantially higher product densities although equivalent water activity values within the ranges described herein. Likewise, bar products for complete human field rations are contemplated herein.

The binder (not shown) adheres the dry ingredients together in the food product and typically forms an intermittent essentially invisible "skin" on the surface of the aggregate base. Binder sugar syrup formulations are well known and the skilled artisan will have not difficulty in selecting ingredients and preparing the low water activity binder syrups useful herein. Generally, any type of food product having sufficient tackiness at application temperatures to hold the individual ingredients of the cereal bar base together can be used as the binder. Application temperatures can range from ambient temperature to about 140° C., depending on many factors, including the consistency of the binder at lower temperatures, as many binders are solids or sticky pastes at room temperatures.

Due to the compression action of the vacuum packaging described herein, as compared with previously employed passive atmospheric packaging together with optional compression of the food product, it is not necessary for the binder to possess any "minimum strength" sufficient to withstand the forces involved with compression, shipping and handling. As a result, the binders of the present invention can be much less complex in their formulations.

However, the water activity of the binder needs to be at a level sufficient to maintain product stability at room temperature. Water activity in the binder can be controlled by selection of different types of sugars, humectants, and other low molecular weight ingredients, e.g., salt. As a result, the water activity of the binder can range from about 0.25 to 0.65. In one embodiment, the water activity is between about 0.35 and 0.5. In a preferred embodiment, the binder has a water activity of no more than about 0.45.

In one embodiment, the binder is comprised of sugar syrups prepared from various liquid sugar ingredients, including corn syrups, maltose syrups, and various dissolved dry ingredients sugars, (i.e., fructose, sucrose, dextrose, trehalose, etc.), as well as minor ingredients such as, humectants, including, but not limited to polyhydric alcohols (e.g., glycerin, sorbitol, xylitol, manitol and propylene glycol), and other ingredients, such as salt, in amounts sufficient to provide the desired water activity.

In one embodiment, between about 0.1 and eight (8)% of humectants are used in the binder (and/or base). In addition to lowering water activity, humectants are known to impart a desirable "chewiness" to the product. In other embodiments less than about 0.5% humectants are added to the binder (and/or base). In one embodiment, up to about eight (8)% glycerin is used. It is generally not practical to add higher amounts of glycerin beyond about eight (8)%, since higher levels can cause throat irritation.

Preferred sugar syrup binders contain sucrose (20 to 80 weight %), 42 dextrose equivalent corn syrup (20 to 80 weight %), a humectant, such as glycerin (0 to 6 weight %, with a preferred range of about 3 to 5 weight %) and water (0 to 5 weight %). In an exemplary embodiment the binder has about 62% corn syrup, 4.5% glycerin, 2.5% water, with the remainder being sugar.

In yet another embodiment, the product is substantially free of humectants, such that it is considered an "all natural" food product. Such an embodiment is important to consumers desiring "all natural" products and/or who are sensitive to the flavors imparted to products containing even small quantities of these materials. Such flavors are described by some as being bitter in nature. Furthermore, it is known that the addition of humectants, such as polyol materials, can soften, to various degrees, and adversely degrade the desirable crisp texture of frangible dry ingredients, particularly RTE cereal pieces.

In certain variations, all or a portion of the sugar(s) content can be substituted with fructo oligo saccharides ("FOS") ingredients such as inulin to provide added soluble fiber benefits. Of particular interest is inulin in view of its bland flavor and solubility. If present, inulin can comprise from about 0.1 to 50% of the coating composition, preferably about 5 to 15%. If desired, other fructo oligo saccharides ("FOS") can be used in full or partial substitution for inulin, especially short chain FOS ("scFOS"). The FOS materials can conveniently be added to the sugar syrup as either dried materials or in the form of low moisture syrups.

In yet other embodiments, water is used as the binder. In another embodiment, a combination of water and corn starch is used as the binder. Optionally, the sugar binder syrup or slurry can additionally comprise an oil component or oil-bearing component such as peanut butter. In one embodiment, a chocolate or cocoa butter bearing binder is used. Indeed, in less preferred but operable embodiments, peanut butter or other nut butters, especially those processed or hydrogenated to be solid at room temperatures, could be used alone as the binder.

Additionally, other binder-like ingredients of low water activity (i.e., 0.45 and lower) can also be used in like manner to nut butters in addition to or instead of a conventional sugar solution binder, such as honey, concentrated consommés, soft or processed cheeses, fruit pastes or syrups, meat pastes, and the like. In one embodiment the binder ingredient includes isomalt, a low calorie nutritive sweetener. Often, such binder ingredients will include various levels of sugars, salts and/or humectants to lower water activity, but the invention is not so limited. In practice, such binders are combined with base ingredients while the binder is in an uncured or formable state (due to time and/or temperature and/or other condition known in the art) and allowed to finish curing after being packaged together with the base as described herein. Essentially, once the binder cures, the composite mass comprising the binder and base is also considered to be cured or set.

In preferred embodiments, the binder additionally comprises a protein binder ingredient for increasing the strength of the binder. Useful protein binder ingredients are well known and can include, for example, gelatin, modified soy protein, milk caseinate and mixtures thereof. Preferred for use herein as the binder protein ingredient is gelatin, such as in a ratio of about 4:1 with hot water. Use of a gelatin-containing binder with certain RTE cereals improves storage stability, as compared with a carbohydrate non-gelatin binder, by slowing moisture uptake, which can cause various textural defects in the dry ingredients. While bovine sourced gelatin is popular in the US for source availability, cost and religious reasons, porcine and/or the more recently commercially available piscine gelatin sources can be used in full or partial substitution for bovine gelatin as desired. However, especially for those markets that prohibit or disfavor gelatin usage (because of health concerns regarding gelatin, e.g., bovine spongiform encephalopathy) other proteins or even other conventional ingredients, e.g., hydrophilic colloids, can be added to the binder sugar syrup.

In a particular embodiment, the milk protein is obtained from dry milk powder. See, for example, a description of the binder in commonly assigned and co-pending U.S. Ser. No. 09/667,209, entitled, "LAYERED CEREAL BARS AND THEIR METHODS FOR MANUFACTURE" (filed Sep. 21, 2000 by Barrie R. Froseth, et al). If desired, however, protein can be added to the binder in any suitable amount. Good results are obtained when the protein ingredient such as gelatin comprises about 1% to about 8% of the binder.

Although conventional formulations for binder can be used, unlike conventional cereal bar food products, the food products of the present invention require much less binder. In most embodiments, there is more base than binder, but the invention is not so limited, as conventional levels of binder can also be used, if desired. In one embodiment, the food product contains no more than 25% binder. In these embodiments, the sugar binder content is reduced in half compared to otherwise comparable products prepared by conventional techniques. In another embodiment, the food product contains even lower levels of binder, namely about 12.5% binder or less. In yet another embodiment, the food product contains no more than 10% binder. With respect to the individual ingredients of the base, in one exemplary embodiment in which there are two dry ingredients, with the first dry ingredient being a grain-based product and the second dry ingredient being a dried fruit, the ratio of grain-based product to dried fruit to binder is about 20:1:0.5. In other embodiments there is more or less binder and/or dried fruit, but typically there will be more grain-based product than either dried fruit or binder. In some embodiments, there can be about the same amount, by weight, of dried fruit and binder, or there can be more binder than dried fruit.

In one embodiment, the product is fabricated without any binder. In this embodiment, freshly prepared puffed RTE cereal pieces are used while still hot and plastic immediately after puffing, especially cereal pieces prepared by direct expansion from a twin screw extruder. If used immediately after puffing and prior to setting (i.e., before cooling to below their glass transition temperature through cooling and moisture loss), the puffed RTE cereal pieces possess sufficient tackiness and plasticity to be able to be formed into a composite mass employing little or even no binder. In this embodiment, it can be possible to form the food product by compressing hot RTE cereal pieces immediately after being puffed without the use of any binder or with less than one (1)% binder. This is likely possible due to the residual moisture present in the puffed cereal pieces, which flashes off immediately after being puffed, causing the pieces to be somewhat tacky. It is likely that as the cereal pieces cool as well as lose the surface moisture, they pass through glass transition, such that the cooled product is less tacky. In another variation, additional dry ingredient(s), such as dried fruit, can be used in addition to puffed RTE cereal pieces, together with less than one (1)% binder.

In one embodiment, the food product further contains a topical coating or topping layer. The topping can be a creamy topping, such as a frosting covering a portion or even the entire surface of the food product or a glaze that is drizzled onto the top layer. The topping layer can also be any other type of coating made from any of the foods noted above. Preferred for use are chocolate coatings, icings and confectionery fat coatings. In yet another alternative embodiment, dry or powdered ingredients are used as a topping layer either alone or in conjunction with a creamy topping layer. This includes, but is not limited to, colorings, sugars in various forms (e.g., brown sugar, white sugar, confectionery sugar, etc.), sugar substitutes, ground or powdered spices (e.g., cinnamon, nutmeg, cardamom, various salts, etc.), herbs, dried whole fruits flavorings and other flavorings as defined herein, which can be added as dried or powdered flavorings, other powdered toppings (including powdered fruits, milks, milk fractions, juices, cheeses and/or dried cheese powders, meat or fish flavors, tomato or barbeque flavors, butter, caramel, salt, etc.), aromatic substances, including any type of taste-enhancing additives, and so forth.

In yet another embodiment, the food product is partially or completely enrobed in a coating. The coating can be a liquid coating that solidifies at room temperature and is applied by dipping the food product into a heated bath of the coating, such as a chocolate coating. Alternatively, the food product can be submersed into a dry or powdered coating and rolled around until adequate coverage is obtained. This can include, for example, a dusting with cinnamon and sugar, milk powder and sugar, and so forth.

In one embodiment, the food product further includes any type of filling layer or core portion. In most such embodiments, such a filling layer would have a variable thickness with a non-uniform appearance along the outside edge. In another embodiment, some or all of the layers are twisted within the food product to form a swirled pattern. In yet another embodiment, the filling is applied in the middle and the product shaped into a log roll. In one embodiment, the filling layer is a dried milk-filling layer. In another embodiment, the filling layer is any type of creamy or chunky layer. This can include, but is not limited to, any type of peanut butter layer, chocolate layer, frosting layer, honey layer, yogurt layer, gelatin layer, fruit filling layer, including a fruit paste layer, and so forth. The filling layer can also be made with any other suitable foods or food combinations, including any type of additive. Examples include cereals and cereal pieces, granola pieces, nuggets, nuts, nut pieces, marshmallows, marshmallow bits (marbits), candies, candy pieces, cookies, cookie pieces, chocolates and chocolate products, including white and milk chocolates (e.g., chocolate chips, candy bars, etc.), other types of edible particulates (e.g., peanut butter chips, butterscotch chips, etc.), fruits (whole or pieces), dried fruits (whole or pieces), e.g., coconut, raisins, including freeze-dried fruits, fruit parts, fruit products (e.g., fruit syrups, etc.), and so forth. This can include, but is not limited to, any type of peanut butter layer, chocolate layer, frosting layer, honey layer, yogurt layer, gelatin layer, fruit filling layer, fruit paste layer, meat layer, and so forth. The filling layer can also be made with any of the foods or food combinations described above for use as a dry cereal ingredient or binder. The filling layer can also be any type of confectionery filling or compound coating, including the type of milk filling layer discussed in U.S. Ser. No. 09/667,209, supra.

Use of milk derived ingredients either in a filling layer or in the binder or base can add substantially to the nutritional value of the vacuum packagable food product. This can be in the non-fat dry milk solids or "powdered milk", milk fractions, e.g., whey or whey protein solids, and so forth. Such a product could be considered diabetic-appropriate for class II diabetes, as it would slow the insulin response. With the use of vacuum packaging, such a product is shelf stable for up to one year or more.

The overall water activity of the final product is also a consideration. It is known that as the $A_w$ increases, the cereal texture is negatively impacted, becoming soggy and stale at some specific value, depending on the cereal selected. However, as the $A_w$ decreases, the binder becomes more crystalline and brittle due to the absence of the plasticizing effect of water. Broadly, the present food products can range in water activity from about 0.2 to about 0.5. At higher values, product shelf life can degrade due to undesirable deterioration of one or more sensitive ingredients. At very low water activities, one or more product ingredients can exhibit excessive hardness. For example, dried fruit ingredients such as raisins can become too hard as moisture migrates from the moister raisin to the very dry RTE cereal. Better results are obtained when food products are characterized by water activities ranging from about 0.3 to about 0.45. It is important to note that since the RTE cereal base ingredients have water activities of below 0.2, greater proportions of binder or binders having higher water activity values can be employed such that the combined products after equilibration enjoy $A_w$ values within the present ranges. For best results, the present food products are formulated and prepared to have water activity values ranging from about 0.3 to 0.4.

Unlike the components of conventional portable food products, the food products of the present invention are not crushed or broken during production resulting from the absence of a compression step during fabrication. Surprisingly, in one embodiment, at least 85% of the frangible food products remain whole and undamaged. This is particularly advantageous for embodiments in which RTE cereal or RTE cereal combinations comprise one of the dry ingredients. Specifically, most of the RTE cereal pieces in the single composite mass remain whole and unbroken, thus maintaining a shape recognizable to the consumer. In one embodiment, at least 90% of the RTE cereal pieces are whole cereal pieces. It is the whole frangible products that contribute, in part, to the irregular appearance of the embodiments having uncut surfaces or edges. As a result, although it can be said that the food product has a particular shape, such as substantially rectangular, the actual shape is a much less defined shaped than conventional cut food products. For example, although the food product in FIG. 1 is "substantially" rectangular, the edges of the food product are clearly not substantially straight, as in conventional cut food products. Rather, if one were to trace the outline of the food product in FIGS. 1 and 2, it is clear that the edges contain primarily curved lines, with multiple bumps and indents, from the irregular placement of the whole cereal pieces along the edges. In other words, there is no leading edge or trailing edge to the food product.

While not critical per se, an advantage of the present packaged food products is having an improved crush resistance feature. Due to the closely interlocked structure of the puffed cereal pieces, the products exhibit a surprising resistance to crushing compared to loosely packed equivalent RTE cereals. Packaged food products herein can be prepared that exhibit a crush resistance of up to 90 KPa before exhibiting crushing or deformation. Conveniently, the vacuum package provides structure and break resistance to the food piece such that a conventional "U" board or other support layer is not required herein.

The food bars of the present invention are designed to be packaged in a vacuum package that is an active package that serves not only to form the food product, but also helps to preserve freshness. The use of vacuum packaging also allows for less binder to be used, as compared with conventional cereal bars, yet still maintain a bar integrity without falling apart. The resulting product maintains its full color, texture and flavor, yet is not overly sweet, as in most embodiments, the binder comprises less than 25%, by weight, of the product. Of course, if desired, vacuum packaged food bars products of the present invention can be prepared with higher levels of binder, e.g., up to 65% binder, yet still at least enjoy the extended shelf stability, crush resistance and other advantages of the present invention. For example, bar product having high binder levels and comprising oxygen sensitive ingredients such as freeze dried fruits or dried cranberry pieces can enjoy the shelf stability advantages even if high in sweetness due to high binder levels.

Figure 2B:
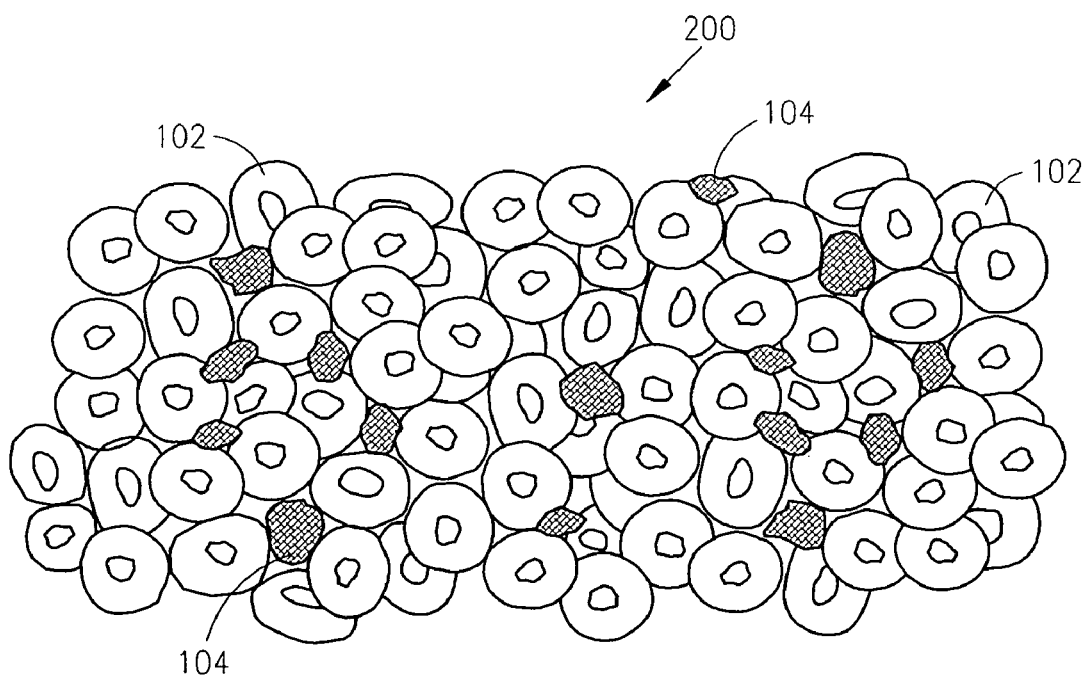
FIG. 2B is a schematic drawing of an uncured food piece in one embodiment of the present invention.
Figure 3A:
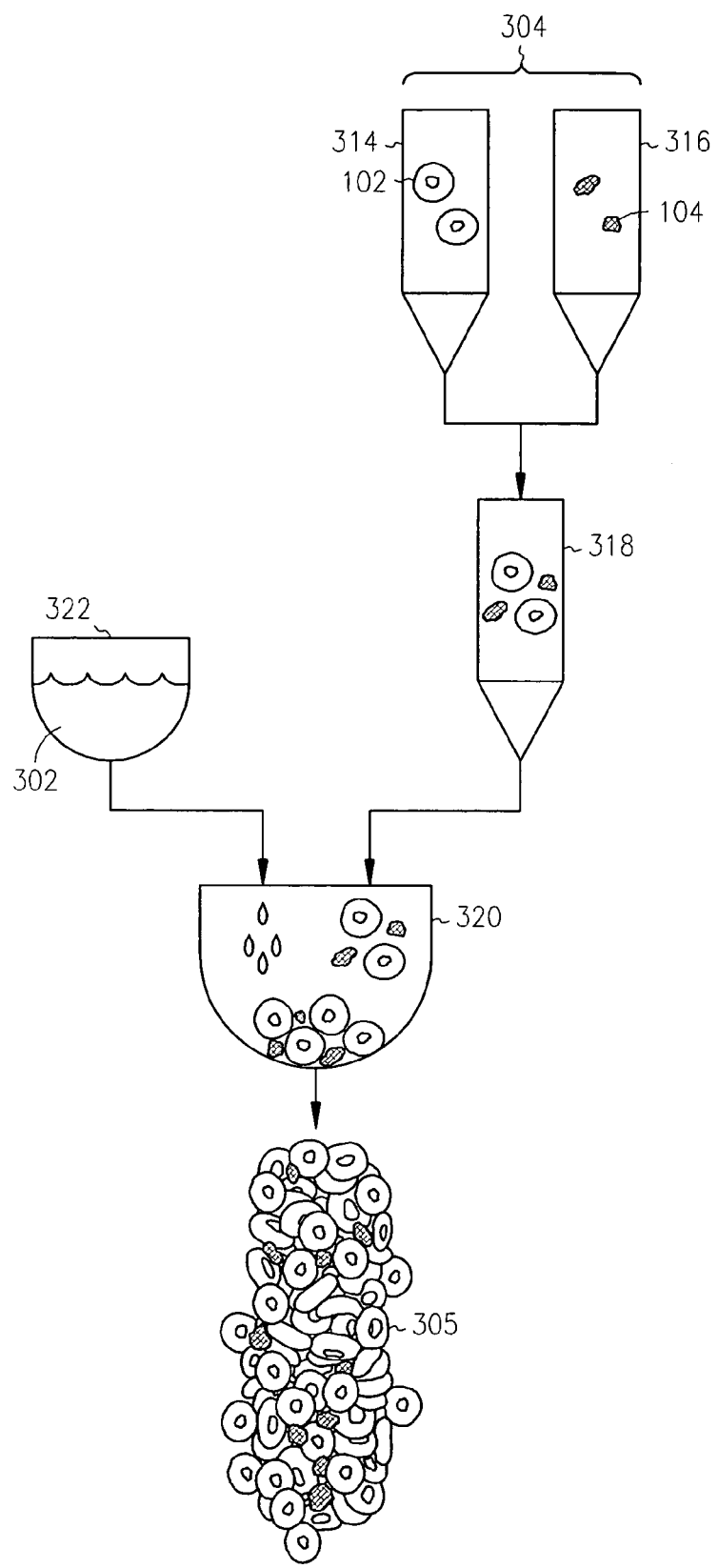
FIG. 3A is a simplified schematic drawing of a process for producing the uncured food piece of FIG. 2B in one embodiment of the present invention.
Figure 3B:
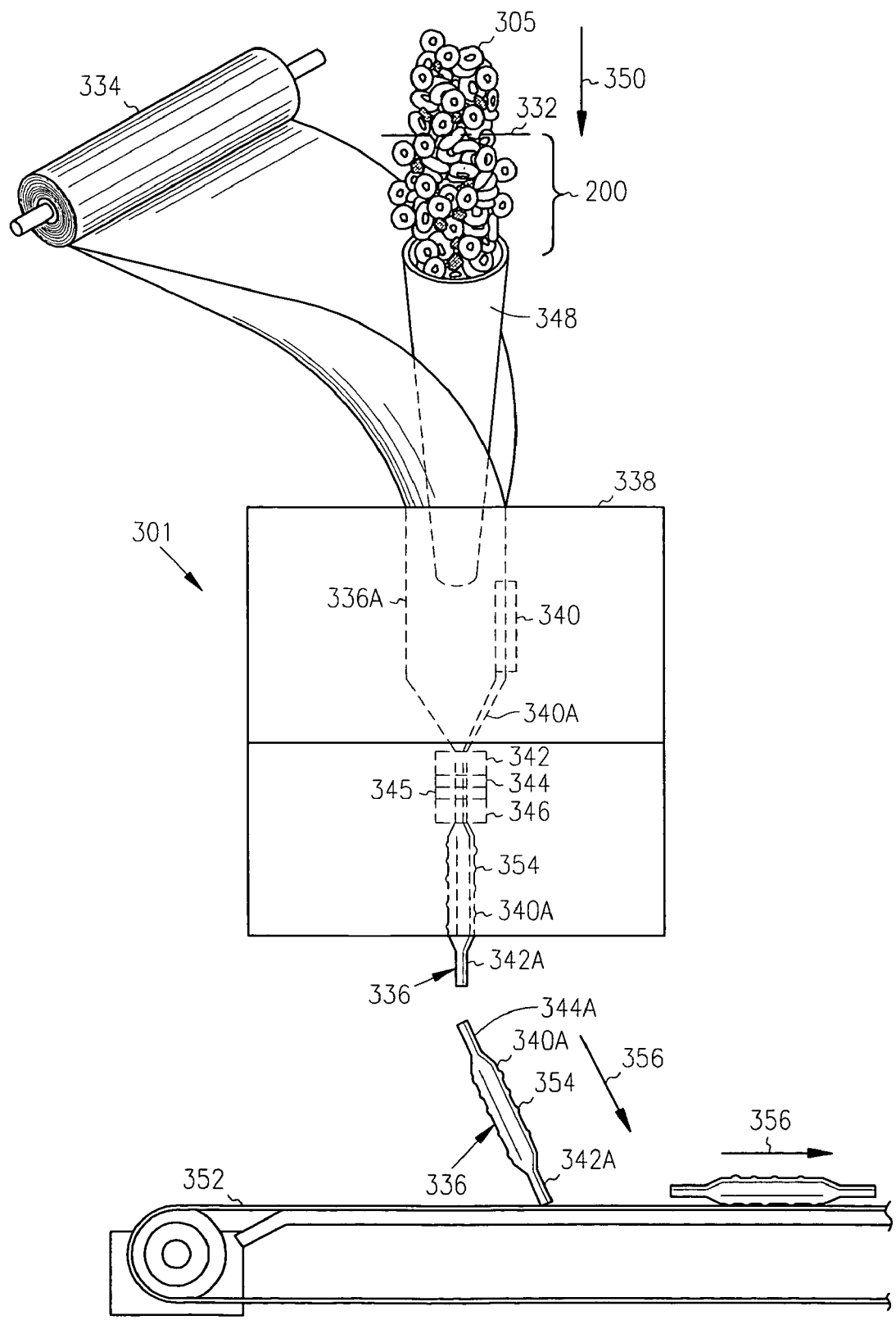
FIG. 3B is a simplified schematic drawing of a process for vacuum packaging the uncured food piece of FIG. 3A in one embodiment of the present invention.

FIG. 2B depicts one embodiment of an intermediate or uncured food piece 200, as it appears prior to being packaged (See FIGS. 3A and 3B). Although the components are identical to those found in the cured food piece 100 described above, the uncured food piece 200 is less compact than the cured food piece 100. In one embodiment, the uncured food piece 200 is about 5 to 20% larger in size as compared with the same amount of a cured food piece 100. The uncured food piece 200 is also warmer in temperature than the cured food piece 100, i.e., 35 to 100° C. As a result, the components of the uncured food piece 200 are not yet at equilibrium. Specifically, the individual water activity of the various components are still intact, namely the relatively higher water activity of the binder (not shown) and the lower water activity of the base, since the components have not equilibrated at one overall water activity.

Method of Making Vacuum Packagable Food Product

The present invention further provides methods for making vacuum packaged food products comprising, in one embodiment, mixing a settable binder with a quantity of one or more particulate dry ingredients to form a workable composite mass or mixture; and vacuum packaging a quantity of workable composite mass in a package at least a potion of which is fabricated from a flexible film to thereby form the mass into a shape, and allowing the composite mass to cure to form a vacuum packaged food product in the form of a single shaped piece. In one embodiment, the food product is vacuum packaged by first subdividing the workable composite mass to form measured quantities and then placing a measured quantity into a package, applying a vacuum to the package, sealing the package, and allowing the food product to cure. With the active package of the present invention, the packaging essentially forms and holds the quantity of pre-cured mass into a shape until the binder cures, e.g., moisture equilibration and/or cooling, to form a product that retains this shape. Additionally, the use of vacuum packaging allows products containing even highly oxygen-sensitive components to be shelf stable for at least 3 months up to about 12 months.

Binder Preparation

The binder can be prepared in a binder preparation sub-step according to any binder technique known in the art whether batch, semi-batch, continuous or mixtures thereof. In an exemplary embodiment, the binder is comprised of a sugar syrup, which can be made according to any means known in the art. Typically, such binders are prepared by admixing wet and dry ingredients and heating to dissolve the dry ingredients and cooking, if required, to remove added moisture to provide sugar binder syrups of desired solids concentrations and water activity values.

Food Product Preparation

In most embodiments, the food products of the present invention are produced by combining binder 302 (prepared in a binder use kettle 322) with one or more dry ingredients, i.e., "base" 304 to produce a workable composite mass 305 as shown in FIG. 3A. In this embodiment, the base 304 is comprised of the primary base ingredient 102, such as puffed O-shaped RTE cereal pieces, and the secondary base ingredient 104, such as freeze-dried fruit, discussed herein, although the invention is not so limited.

Bulk amounts of each of the dry ingredients are typically placed in their respective tote dumpers. In the embodiment shown in FIG. 3A, the primary base ingredient 102 is located in a cereal tote dumper 314 and the secondary base ingredient 104 is located in a dried fruit tote dumper 316.

The dry ingredients of the base exit the dumper 314 and eventually fall into a hopper 318 located above a mixer 320. In one embodiment, a constant speed screw is located in the bottom of the hopper to keep the flow constant rather than cyclical, thereby maintaining a constant ratio between binder and base. In one embodiment, the dry ingredients of the base are first dumped onto one or more secondary conveyors prior to entering the mixer, such as cleated inclined belt conveyors.

The binder 302 can be added in any suitable manner to the mixer 320. In one embodiment the binder is pumped out of the binder use kettle 322 at an elevated temperature, with a binder pump into a binder application manifold (not shown).

The base, i.e., primary and secondary dry ingredients 102 and 104, respectively, and binder 302 are combined in the mixer 320 for a suitable period of time to provide an homogenous well blended mixture of binder smoothly coating the surface of the various particulates. In some embodiments, other ingredients, such as any of the ingredients described above, including reground material, larger particulates, clusters (more than one dry ingredient adhered together), and so forth, follow the same path to the mixer in the same manner described above for the dry ingredients.

The temperature of the binder 302 decreases only modestly as it flows through the manifold. In one embodiment, the binder enters the manifold at a temperature of about 54° C. (130° F.). In one embodiment, the binder exits the manifold at a temperature of about 52° C. (about 125° F.). In another embodiment, the binder has a temperature of about 49° C. (about 120° F.) as it combines with the dry ingredients. However, in embodiments not using protein it is possible to use higher temperatures, since there is no concern re protein degradation causing off-flavors to develop. In some instances, higher temperature can be needed to keep the binder from reaching its glass transition temperature and becoming prematurely cured or hardened.

In preferred embodiments, the binder 302 and dry ingredients (102 and 104) are combined in a ratio such that there is generally less binder than base, and in most embodiments there is only about 25% binder, by weight, as compared with the base. In other embodiments, the binder to base ratio is about 1:1 as is known in the art. In embodiments in which there are two dry ingredients in the base 304, as in FIG. 3A, e.g., primary and secondary base ingredients, 102 and 104, respectively, the ratio of the binder to primary base ingredient (e.g., RTE cereal) to secondary base ingredient (e.g., dried fruit) can range from about 1:5:0.5 to 1:10:1. In this embodiment, the resulting mixture has a temperature of about 32 to 38° C. (about 90 to 100° F.).

In an alternative embodiment, an enrober is used instead of a mixer. In such an embodiment, the base is coated with the binder in the enrober, and then processed in the same manner as discussed below.

The composite mass 305 then exits the mixer 320 still in the form of a plastic workable, typically warm, composite mass of loosely agglomerated particles of the various base ingredients, and enters the vacuum packaging apparatus 301 (shown in FIG. 3B) directly from the mixer 302, with the package-forming process itself providing the shaping means for the mass 305.

In an alternative embodiment, after exiting the mixer 302, the workable composite mass 305 passes through a means for applying compression that provides minimal compression to the mass prior to entering the vacuum packaging apparatus 301. In one embodiment, the mixture is compressed due to an opening in the mixer that is sized to cause slight compression of the mass, e.g., a funnel. In another embodiment, the workable composite mass passes through one or more compression rollers arranged to provide minimal pressure. In most embodiments, the compression applied is sufficient to provide no greater than about 10 to 20% compaction in volume, in order or minimize breakage of the frangible food ingredients. However, it is possible to have compression up to about 40% in some embodiments.

In most embodiments, the process has the advantage of producing minimal waste since there are no trim pieces due to cutting. This can result in significant savings as compared to conventional processes that require cutting, as such trim losses alone can approach 12% or more. In one embodiment, the workable composite mass 305 can optionally pass through a cinnamon duster where a topical flavoring cinnamon/sugar (1-10:100) mixture is applied.

Vacuum Packaging Step

Referring now to FIG. 3B, the workable composite mass 305 can be packaged by first subdividing it into desired portions by any suitable means. In the embodiment shown in FIG. 3B, the workable composite mass 305 is divided into a desired portion that is substantially the same size as the uncured food piece 200 described above in FIG. 2B. Again, the subdividing or separating means will, in most embodiments, not result in straight, knife-cut edges. The subdividing means should be designed to cause a minimal amount of impact or damage to the product, such that most or nearly all of the frangible dry ingredients of the base remain intact, i.e., whole and not crushed. In the embodiment shown in FIG. 3B, a wire cutter 332 is used, although the invention is not so limited. In another embodiment, a rotary valve is used to process the mass, such that after a given amount of the workable composite mass is moved through, the valve closes, causing the given amount to drop into the packaging device. In another embodiment, roll extruders together with a wire cutter are used. In yet another embodiment, subdivided amounts are dropped onto a moving sheet or conveyor and a vacuum is pulled each one. In yet other embodiments, ultrasonics can be used to subdivide the workable composite mass into sized and roughly shaped amounts. In yet another embodiment, the workable composite mass 305 is pumped into a chamber having a piston designed to dump the contents of the chamber into an individual package. In less preferred embodiments, the workable mass is formed into continuous sheets that are cut into ribbons by conventional rotary knifes or sonic cutters to form ribbons that are in turn subdivided into individually shaped and sized portions of composite food mass. Such an embodiment can include any suitable means for subdividing the portions, including a wire, ultrasonics, and so forth. The desired portions are typically determined according to weight, such that individual servings of the desired weight, as described above, are created Regardless of how individual portions are prepared, the present methods of preparation can further include the step of packaging the individual portions of quantities into vacuum packaging that forms the workable portions of the composite mass into a desired shape. In preferred form, the products are in the form of a food bar disposed within a vacuum package or pouch fabricated from flexible packaging material such as packaging film. The vacuum package or pouch can be fabricated using any suitable type of packaging device. In the embodiment shown in FIG. 3B, a packaging device similar to the device used to create a vertical form filled and sealed (VFFS) package described in U.S. Pat. No. 5,171,950 to Brauner et al, entitled, "FLEXIBLE POUCH AND PAPER BAG COMBINATION FOR USE IN THE MICROWAVE POPPING OF POPCORN," (issued Dec. 15, 1992), commonly assigned and incorporated herein by reference, is used, although the invention is not so limited. However, unlike a traditional VFFS package made of breathable high density polyethylene, the packages of the present invention are made with materials designed to hold a vacuum.

Any suitable type of vacuum food packaging can be used. In one embodiment, the packaging includes at least a portion that is flexible such as to engage the workable food mass and confine that mass into a desired shape during the curing step. In a preferred embodiment, any of the vacuum packaging means and packaging materials of PACKAGE AND METHOD, supra, is used to provide a package in the form of a flexible film pouch. For example, a vacuum tube and nozzle can be removably coupled to the pouch. A vacuum is drawn on the pouch and the pouch is heat sealed. Good results are obtained when the sealed pouch has a vacuum of 50 millibar or less, and for better results, less than 15 millibar. In other variations, the pouch can have a lower vacuum by partially back flushing the pouch with a controlled low oxygen atmosphere up to 150 millibar of nitrous oxide, argon, neon or mixtures thereof. Such vacuum packages provide sufficient compression to the composite food mass to hold the mass in shaped form until the binder sets to cure the mass into the desired end product form.

In the embodiment shown in FIG. 3B, a continuous roll stock 334 of flexible heat sealable laminated film packaging material is provided, such as a double layer of material, thus providing inner and outer layers with a thermoplastic sealing layer and intermediate adhesive layers. For example, the inner layer can additionally include a release agent to facilitate removal of a food bar from the package that included particularly sticky ingredients. The packaging film can of course include additional layers or layer properties in known manner, e.g., metallization, to improve one or more package properties, e.g., reductions in gas permeability.

The forming horn 338 is shown in FIG. 3B in block form. As can be understood from this view, the roll stock 334 is folded into an envelope or rough-like configuration 336A as it is being drawn from its rolled condition. The marginal portions of the roll stock 334 are urged into engagement and heated by a vertically oriented sealer 340 to form a lap or fin seal or seam 340A along an edge of the envelope 336A. There is an upper horizontal or transverse sealer 342 in this embodiment that forms a bottom seal 342A to seal the bottom end of the envelope 336A. Additionally, a lower horizontal or transverse sealer 344 forms an upper seal 344A to seal the upper end of a subsequent envelope 336A. Just prior to, or in conjunction with creating the upper seal 344A in the subsequent envelope 336A, a vacuum 345 is applied. After the upper seal 344A is formed, the resulting pouch 336 is separated from the preceding envelope 336A with a cutter 346 as shown.

A food feed funnel 348 can be used to deliver a measured quantity or supply of the workable composite mass 305, e.g., the uncured food piece 200, into the envelope or trough 336A that results in the completed pouch 336. In another embodiment, the funnel is replaced with a substantially straight cylinder or tube. In yet another embodiment, the funnel is divided longitudinally to accommodate additional and/or separate ingredients, in order to provide an alternative appearance and/or flavoring/texture to the final product. Continuing with the process of FIG. 3B, the flow of the uncured food piece 200 is downwardly as indicated by arrow 350. After sealing by the sealers 340, 342 and 344, the abovementioned severance by the cutter 346 enables the completed pouch 336 to fall gravitationally onto a conveyor 352 located below, the directional movement of the completed pouches 336 indicated by arrow 356. In one embodiment, not shown, the package can additionally comprise a support layer such as a conventional support "U" board (not shown).

The pouch 336 is an active package that, as FIG. 3B shows, is form-creating and form-fitting, essentially creating, as well as maintaining, the product shape of the contents within. In this instance, "bumps" 354 from the plurality of frangible pieces that comprise primarily the primary base ingredient 102 are contained within the pouch 336 can clearly be seen. In some embodiments, the bumps 354 can be a result of both the primary and secondary base ingredients 102 and 104, respectively. The resulting package or pouch 336 is surprisingly strong and puncture resistant. As can be seen, such a vacuum process as described herein, produces a relatively tight active package, which necessarily means a significantly stronger package as compared with conventional loose-fitting passive packages. In another embodiment, a vacuum chamber can be used during the packaging process, such that the entire packaging process takes place within the chamber.

The resulting vacuum-packaged food products are allowed to cool naturally in most embodiments or can be cooled by cooling means to accelerate curing. As the product cools, the uncured food piece 200 is transformed rapidly over a short cure or cooling time to form the cured food piece 100 shown in FIGS. 1 and 2A. In one embodiment, the uncured food piece 200 cures to a cured food piece 100 in about 4 minutes to 48 hours, depending on several factors, including, product content, temperature, and the like. Specifically, the uncured food piece 200 is formed by the active packaging process to any suitable size and shape. In one embodiment, the resulting cured food piece has a dimension of about 50 to 130 mm (about 0.25 to 0.5 in). Following curing with the active packaging, the density of the dry ingredient base is also increased. In one embodiment, the bulk density of the dry ingredient base after compression is about 1.1 to 1.4 times the bulk density of the dry ingredient base before curing. In a preferred embodiment, the bulk density after compression is about 1.1 to 1.2 times the bulk density of the dry ingredient base before curing. In other words, the compression due to the active packaging is preferably in the range of about 10 to 20%. In an exemplary embodiment, the dry ingredient base has a bulk density of about 1.2 g/cc before curing and a bulk density after curing of about 1.3 to 1.7 g/cc.

Any of the aforementioned commercial devices described in either FIG. 3A or FIG. 3B can include a system controller, as is known in the art. It will also be understood by those skilled in the art that the apparatus for manufacturing the food products includes all known apparatus for moving components into, through and out of a food processing system. This includes, but is not limited to, various types of pumps, filters, strainers (such as magnetic strainers, decline dual strainers, etc.), flow meters, heat exchangers (such as plate type swept surface heat exchangers), drains, level indicators, grate magnets, and so forth. (A grate magnet is essentially a series of parallel magnetic bars placed in an ingredient or product stream to remove magnetic metal particles from the stream as a consumer protection measure). Further, although in many instances only the term "kettle" has been used herein, it is to be understood that in some embodiments there are separate kettles for mixing versus holding, i.e., using. It will further be understood by those skilled in the art that all of the lines in the system are made from materials that can be either flexible or rigid, depending on their location and use. Furthermore, all lines are of a suitable diameter for their intended purpose, but are preferably between about 1.3 cm (0.5 in) and about ten (10) cm (four (4) in) in diameter. It will also be appreciated by those skilled in the art that flexible lines can include hoses made from rubber, plastic or other suitable material, and rigid lines can be made from galvanized metal, stainless steel, copper, PVC or other suitable material.

Figure 4:
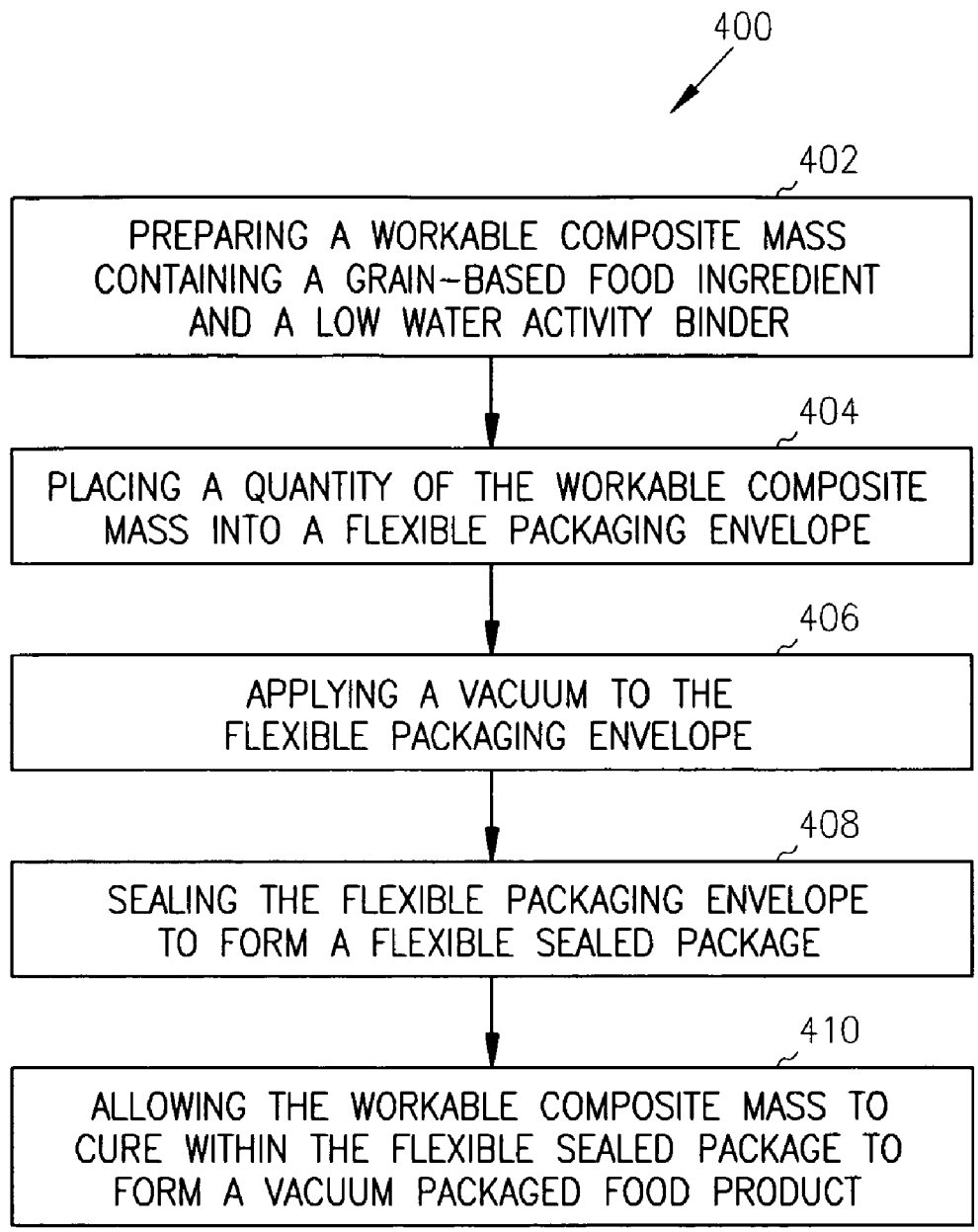
FIG. 4 is a block diagram of the process for making the vacuum packaged food product in one embodiment of the present invention.

A block diagram of one embodiment for producing vacuum packaged food products is shown in FIG. 4. The process 400 begins by preparing 402 a workable composite mass containing a grain-based food ingredient and a low water activity binder and placing 404 a quantity of the workable composite mass into a flexible packaging envelope. The process continues by applying 406 a vacuum to the flexible packaging envelope and sealing 408 the flexible packaging envelope to form a flexible sealed package. The process concludes by allowing 410 the workable composite mass to cure within the flexible sealed package to form a vacuum packaged food product. The product can further be subdivided into desired portions prior to packaging. There is minimal product waste in the process of the present invention, as there is no trimming step required.

In the preferred embodiment, the final products of the present invention are generally less sweet than conventional cereal bars, primarily because less binder is used. In most embodiments, the binder comprises less than 35%, by weight, or even 25% or less of the product. In many embodiments, the product also has a lighter texture as compared with conventional cereal bars, due to the efficient compaction of the vacuum packaging.

Prior to opening and consumption, the vacuum packaging provides a preserved freshness appearance and value. Overall, upon opening the package, surprisingly, the food product is in the form of a single piece such as bar that retains its bar form notwithstanding, in the preferred embodiments, the low binder levels employed. Unlike certain known bar products, the bars are perceived as being relatively dry, i.e., are not sticky, so are readily removable from their package. Those food products that comprise humectants can be chewy from the presence of the binder as well as any chewy dry ingredient and the effects of any humectants. In most embodiments, including those that use RTE cereal pieces, the food product will also have a highly desirable crispy texture due to the use of a frangible food ingredient. Additionally, the food products exhibit a surprisingly pleasing appearance resulting from the piece integrity of a large fraction the frangible ingredients remaining whole. The products exhibit superior product stability as indicated by low hexanal values.

Although the food product has been described primarily in terms of a handheld product containing RTE cereal pieces, it should be understood that virtually any type of dry ingredients can be combined and packaged as described herein, including various types of crackers, pretzels, grain-based chips, popcorn and so forth. In one embodiment, the food product is a savory seasoned snack. In other embodiments, the food product can be formed around one or more sticks or handles, so that the consumer can avoid touching the product, if desired, without use of an external material such as the torn packaging, napkin and so forth. In yet another embodiment, the food product can be a controlled portioned animal food, such as an animal treat.

Unlike some conventional cereal bars, the food products of the present invention are not baked, but are non-cooked food products formed from pieces of identifiable grain-based ingredients pressed together with other components and delivered with minimal, if any, damage.

Although specific embodiments have been illustrated and described herein, it will be appreciated by those of ordinary skill in the art that any arrangement that is calculated to achieve the same purpose can be substituted for the specific embodiments shown. This application is intended to cover any adaptations or variations of the invention. It is intended that this invention be limited only by the following claims, and the full scope of equivalents thereof.

What is claimed is:

1. A method of forming a vacuum packaged food product comprising:
    placing a single uncured composite mass, which is deformable and contains a quantity of identifiable grain-based frangible food particles, into a packaging material, the single uncured composite mass having a low water activity binder comprising less than 25% by weight of the composite mass, wherein at least a portion of the packaging material is flexible and the single uncured composite mass has a water activity between about 0.2 and about 0.5;
    applying a vacuum to the packaging material;
    sealing the packaging material to form a flexible sealed package which maintains at least a partial vacuum and is free of added headspace gas, wherein the flexible sealed package is an active package which provides compression action to the single uncured composite mass contained therein; and
    allowing the compression action of the active package to urge the single uncured composite mass to progress, over time into a single cured composite mass which is cooler in temperature and smaller in size than the single uncured composite mass, wherein the single cured composite mass and flexible sealed package form a vacuum packaged food product, further wherein at least 90% of the food particles in the vacuum packaged food product are unbroken.

2. The method of claim 1 wherein the single uncured composite mass forms into the single cured composite mass within about 4 minutes to 48 hours.

3. The method of claim 1 wherein a vacuum of 50 millibar or less is applied to the package.

4. The method of claim 1 wherein the single uncured composite mass comprises less than 10% binder, by weight.

5. The method of claim 4 wherein the vacuum packaged food product contains one or more highly oxygen sensitive ingredients.

6. The method of claim 5 wherein the one or more highly oxygen sensitive ingredients is fruit or dried fruit.

7. The method of claim 1 wherein the vacuum packaged food product has a substantially rectangular final shape.

8. The method of claim 1 wherein the food particles are RTE cereal pieces and at least 99% of the RTE cereal pieces are whole cereal pieces.

9. The method of claim 8 wherein the RTE cereal pieces are selected from o-rings, flakes, shreds, biscuits, rings, spheres, squares, rounds, triangles, convex-shapes, hexagonals, tubes, bugles, oblongs, pillows and mixtures thereof.

10. The method of claim 1 wherein the vacuum packaged food product further contains ingredients selected from dried fruit pieces, nuts, nut pieces, marshmallows, marshmallow bits, dried marshmallows, candies, candy pieces, cookies, cookie pieces, chocolates and chocolate products, including white and milk chocolates, peanut butter chips and butterscotch chips, and raisins and mixtures thereof.

11. The method of claim 1 wherein the binder is carbohydrate-based and protein-free.

12. The method of claim 1 wherein the binder is a sugar-protein binder.

13. The method of claim 1 wherein release additives are included in the vacuum packaged food product.

14. The method of claim 13 wherein the release additives are selected from cheese, peanut butter and meat paste.

15. The method of claim 1 wherein the vacuum packaged food product further comprises a coating, a filling, or combinations thereof.

16. The method of claim 1 wherein the binder is swirled together with the quantity of identifiable grain-based frangible food particles.

17. The method of claim 1 wherein the vacuum packaged food product is fortified with vitamins or minerals, wherein at least one of the minerals is calcium provided by calcium ingredients having a particle size of no more than 20 microns.

18. The method of claim 1 wherein the single uncured composite mass has up to about 0.5%, by weight, of one or more humectants.

19. The method of claim 1 wherein the vacuum packaged food product is shelf stable for at least 3 months.

20. The method of claim 1 wherein the packaging material is puncture resistant and made from a film having an oxygen barrier and a moisture barrier.

21. The method of claim 1 wherein the binder has a water activity ranging from about 0.25 to about 0.65.

22. The method of claim 1 wherein the single uncured composite mass is about five (5) to 20% larger in size than the single cured composite mass.

23. The method of claim 22 wherein the single uncured composite mass is about 35 to 100° C. warmer than the single cured composite mass.

24. The method of claim 1 further comprising preparing the single uncured composite mass.

* * * * *